June 20, 1972 G. MOE 3,671,318
METHOD FOR PRODUCING A WATER ACTIVATABLE BATTERY
Filed June 12, 1969
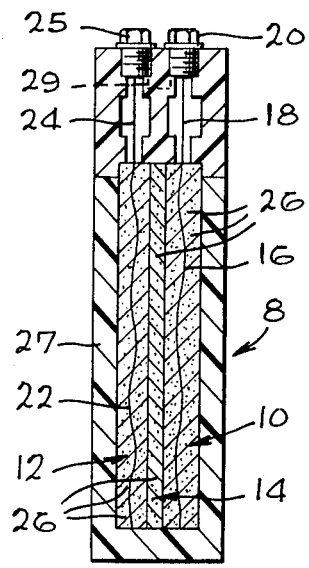
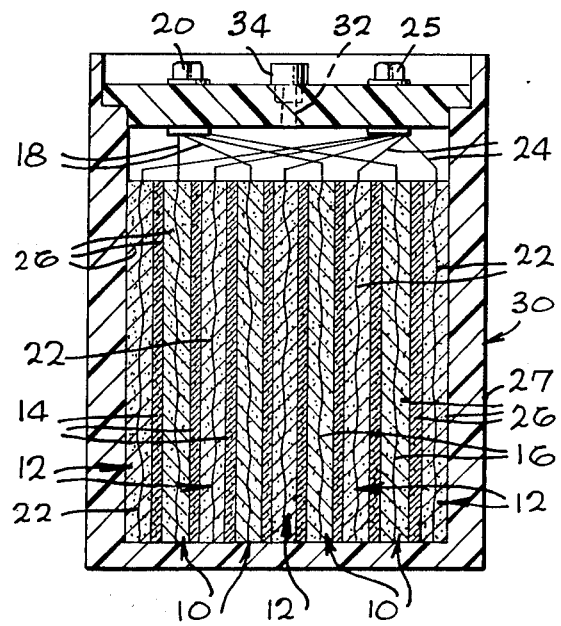
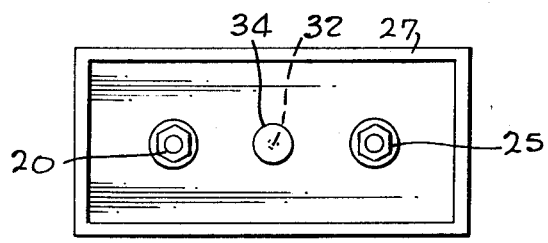
GEORGE MOE
  INVENTOR.
BY Max Gelden
ATTORNEY

# United States Patent Office 3,671,318
Patented June 20, 1972

3,671,318
METHOD FOR PRODUCING A WATER
ACTIVATABLE BATTERY
George Moe, Santa Ana, Calif., assignor to McDonnell
Douglas Corporation, Santa Monica, Calif.
Filed June 12, 1969, Ser. No. 832,618
Int. Cl. H01m 35/00
U.S. Cl. 136—6
8 Claims

ABSTRACT OF THE DISCLOSURE

A water activatable battery comprising as components a pair of electrodes, e.g. Ag-Zn, in the fully charged state and a separator, e.g. composed of olivine, between them, the components being substantially dry and having the evaporation residue of an aqueous alkali electrolyte solution, e.g. KOH, substantially uniformly distributed throughout. Method for producing the above battery comprising adding an aqueous alkali electrolyte solution to a battery having as components a pair of electrodes of opposite polarity and a separator between them, fully charging the electrodes, drying the battery at elevated temperatures until substantially all of the water from the electrolyte solution is removed.

---

This invention relates to batteries, particularly high energy density batteries, and is especially concerned with the provision of novel "dry charged" batteries which are immediately activated upon the addition of water, and which deliver as much as 96% of actual capacity after repeated charging and recharging.

The invention is also concerned with procedure for producing such "dry charged" water activatable batteries.

Batteries are an important source of energy storage for power generararation. In addition to the common lead-acid storage battery, an important type of battery is the high energy density alkaline electrolyte battery using such electrode combinations as silver-zinc, silver-cadmium nickel-zinc, and nickel-cadmium. High energy density batteries are generally battery systems which have a substantially higher energy per unit of weight than conventional, e.g., lead-acid storage batteries. Such high energy density batteries have many applications such as in portable tools and appliances, television, radio and record players, engine starting, portable X-ray units, and the like.

In high energy density batteries as above described such as silver-zinc, the electrodes are placed adjacent opposite sides of a membrane or separator which performs the function of retaining electrolyte, separating the electrodes, and preventing migration of electrode ions which short circuit the battery. Separators are conventionally of organic materials, e.g. polymers, but these are limited to low temperature use. Improved inorganic separators have recently been developed, e.g. in the form of certain aluminosilicates which are particularly suited for use in high energy density batteries, as described, for example, in Patent No. 3,379,570. Such inorganic separators, preferably in the form of sintered ceramic separators, when assembled in a battery of this type, e.g., a silver-zinc high energy density battery, have resulted in substantially improved battery life at both ambient temperature and elevated temperature, that is, a battery capable of operating efficiently over a large number of discharge-charge cycles, and such batteries are also operable at high temperature, e.g., of the order of 100° C. and above.

For activation of these high energy density batteries, the pores of the separator are filled with an aqueous solution of an alkali such as potassium hydroxide. Usually, it is the practice to introduce the aqueous alkaline solution into the battery just at the time that the battery is to be placed in operation. Often, however, this practice is not possible or is highly impractical. In many applications in the field, for example, it is inconvenient to store aqueous alkaline solutions to be incorporated into these batteries when power is required therefrom. Additionally, such solutions are caustic in nature and require special and careful handling to avoid injury.

Several methods have been suggested for purposes of activating batteries of the type described above without the necessity of using aqueous alkaline solutions. In British Patent No. 813,408, for example, there is disclosed the incorporation of solid alkaline powder into the electrode or separator material after which distilled water is added when activation is desired. A slightly different embodiment provides a separate compartment in the battery for storage of the dry electrolyte. The electrolyte in these batteries, however, is not uniformly distributed throughout the battery, requiring an extended period before the equilibrium state is reached where there is a uniform distribution of electrolyte solution throughout the system and the battery operates at its intended performance level. Further, the water required for activation and the dry solid electrolyte material occupy a volume greater than that of the final solution. A battery providing a chamber of enlarged capacity to hold sufficient water is the subject of U.S. Pat. 2,077,561. The battery of the latter patent, however, still requires an extended time period before it operates to provide its designed energy output.

Another illustrative battery is disclosed in copending U.S. application S.N. 463,569 of Carl Berger, et al., filed June 14, 1965, now Pat. No. 3,471,330. The battery disclosed in this application contains solid, dry alkaline powder dispersed in at least one of the electrode or separator materials. Activation of the battery can be effected either by the addition of water as described above or by subjecting the battery to elevated temperatures of the order of about 300° C. to about 400° C., above the melting point of the alkaline powder, e.g. potassium hydroxide. Another thermally activated battery disclosed in U.S. Pat. 3,026,364 employs manganese dioxide as the anode, oxygen as the cathode and an alkali metal hydroxide electrolyte solvent. Operating and activation temperature is about 350° C.

The thermally activated batteries provide convenient means for cell activation under ocnditions of high temperature. However, in many instances such as out in the field, the provision of such high temperatures is difficult and impractical. Furthermore, time is lost in raising the battery to a temperature in the range of 300 to 400 degrees centigrade and therefore thermal activation does not answer the need for a simple, safe, rapid and effective means for battery activation.

It has now been found, according to the present invention, that batteries, especially high energy density batteries, can be produced which are capable of rapid and effective activation when power is required, simply by the addition of water. Such batteries are produced by a novel method which comprises assembly of the battery, adding an aqueous alkaline electrolyte solution, charging the battery to the fully charged state, and removing the water from the aqueous electrolyte solution by drying at elevated temperatures, and preferably at reduced pressure to facilitate water removal. At this point the battery is in the "dry charged" state and can be sealed and stored until needed. When power is required, the simple addition of distilled or deionized water to the battery provides immediate activation.

The invention provides a battery which is immediately activated and usable simply upon the addition of water. Water activation is simple, safe and convenient, removing any need for storage and use of dangerous caustic solutions or high temperature conditions. Rapid activation is possible because the battery of the invention when in the "dry charged" state has electrolyte uniformly distributed throughout the battery electrodes and separator. The relatively long period required for water activation of prior art devices to allow equilibrium distribution of electrolyte is thereby eliminated.

Further, after a period of use including repeated charging and recharging, the battery of the invention can be "dry charged" any number of times and stored until needed. Upon activation thereof, the battery provides substantially the same capacity as obtained initially.

An additional advantage of the invention is that after aqueous alkaline electrolyte solution is added to the battery, the battery can be subjected to a formation and quality control check before being finally charged followed by dehydration or water removal, thereby indicating if the battery initially has the desired quality in terms of desired capacity. This "pretesting capability" provided by the instant invention process presents a substantial advantage over the conventional dry charged battery, where it is not possible to determine in advance whether the battery following activation, can deliver the required or specified performance capacity.

A still further advantage is obtained by the invention over prior art devices, in that in the present invention a separate compartment for storage of dry alkali pellets is not required. The battery according to the invention, therefore, is smaller in size.

The invention will be more readily understood from the description below, taken in connection with the accompanying drawing wherein:

FIG. 1 is a schematic representation of a single cell battery construction embodying the invention principles;

FIG. 2 illustrates a multiplate battery according to the invention; and

FIG. 3 shows a plan view of the battery of FIG. 2.

The drawings are exaggerated for greater clarity.

Referring now to FIG. 1 there is shown a single cell battery 8 which incorporates the invention principles. As shown, the components comprise electrodes 10 and 12, for example Zn and Ag, disposed on opposite sides of a separator 14 which is comprised, for example of olivine. A collector grid 16 embedded in electrode 10 is connected by means of a lead 18 to a terminal 20; and a collector grid 22 embedded in electrode 12 is connected by means of a lead 24 to a terminal 25. Aqueous alkali electrolyte evaporation residue illustrated at 26 is shown schematically as dots uniformly distributed throughout the battery 8, that is, in the separator 14 and electrodes 10 and 12. The battery components are housed in a case 27 of a relatively high temperature resistant material, e.g. polyphenylene oxide or polysulfone plastics, which are capable of withstanding temperatures, e.g. as high as 375° F. or higher, and a fill port indicated in dotted lines at 29 is provided in the top of the battery for introduction of electrolyte solution or water for activation.

There is illustrated in FIG. 2 a multiplate battery 30 having five electrodes, 12, e.g. of silver, alternately disposed in relation to four electrodes 10, e.g. of zinc, adjacent zinc and silver electrodes 10 and 12 having separators 14, e.g. of olivine, positioned therebetween. The collector grids or wires 16 embedded in electrodes 10 are collectively connected by means of leads 18 to terminal 20. In the same manner, the collector grids or wires 22 embedded in electrodes 12 are collectively connected by means of leads 24 to terminal 25. Electrolyte evaporation residue illustrated at 26 is uniformly distributed throughout electrodes 10 and 12 and seperators 14. The battery components are housed in a case 27 of the above noted relatively high temperature resistant material, e.g. polyphenylene oxide plastic. A fill port 32 in the top of the case 27 provides a means for introducing electrolyte solution, and water when activation is desired, and which permits sealing of the battery by means of a plug 34 following dry charging of the battery, and also following activation, if desired.

A battery as illustrated in FIG. 1 or FIG. 2, and which is activated upon the addition of water is prepared by assembling the battery components, adding aqueous alkali electrolyte solution to the battery, charging the battery electrodes to the fully charged state, i.e., so that for example the Zn electrode is in the form of Zn and the Ag electrode is in the form of AgO, and drying the battery at elevated temperatures preferably in a vacuum, to remove substantially all of the water from the electrolyte solution.

As illustrated in the drawing, the battery is comprised of at least one pair of electrodes of opposite polarity having a separator disposed between them. The preferred electrode combinations are Ag-Zn and Ag-Cd. Ni-Zn and Ni-Cd "dry charged" batteries can also be provided according to the invention, but are not preferred embodiments since when these electrode couples, particularly the nickel electrodes, are heated to temperature, e.g. of the order of about 75° C. and above, during dehydration or drying of the battery, the capacity of the battery may be reduced.

The separator can be of inorganic or organic materials. Inorganic separator materials which can be used include a variety of porous inorganic or ceramic substances. Thus, for example, suitable inorganic separator materials include insoluble hydrous metal oxides such as the hydrous oxides of zirconium, titanium, antimony, tungsten, silicon, scandium, bismuth, vanadium, aluminum and cerium. A preferred separator of this type is hydrous zirconium oxide or zirconia.

Other porous inorganic materials which can be employed for producing the separator for use in the battery according to the invention include sintered aluminosilicates, especially the alkali metal and alkaline earth metal aluminosilicates, because of their formation of a hard ceramic material upon sintering, while still retaining suitable porous characteristics. The aluminosilicates of suitable porous internal structure are particularly preferred in this respect. Examples include nonfluxed aluminosilicate, fluxed aluminosilicates or salts thereof, such as sodium and potassium aluminosilicates, e.g. magnesium aluminosilicate (cordierite). These materials can be used separately, but often mixtures of the aluminosilicates are used, e.g. complex mixtures of both the alkali metal and alkaline earth metal aluminisilicates. Such aluminosilicate separator materials are described in the above Pat. No. 3,379,570.

Another useful class of inorganic separtor materials are the naturally occurring clay minerals of the kaolinite group. This is a group of naturally occurring clays containing aluminum oxide and silica, usually together with bound water, and having the formula $Al_2O_3 \cdot 2SiO_2 \cdot H_2O$. In addition to kaolinite, other useful members of this group include the mineral clays halloysite, dickite, nacrite and anauxite.

Other types of inorganic separator materials which can be employed include those in the form of a sintered porous solid solution of magnesium silicate and a member selected from the group consisting of zinc silicate and iron silicate, including the naturally occurring magnesium-iron silicate known as the mineral olivine, as described in Pat. No. 3,446,668. An olivine separator of this type can be prepared for example, by sintering at 1200° C. a natural olivine consisting essentially of 41.4% $SiO_2$, 49.3% MgO and 7.7% iron oxide (FeO and $Fe_2O_3$) by weight, the remainder consisting esseentially of trace amounts of CaO and $Cr_2O_3$.

Also, there can be employed the inorganic separator materials in the form of a sintered porous solid solution of an aluminum-bearing material such as aluminum oxide, and a substance selected from the group consisting of chromium, cobalt, nickel, magnesium, calcium and iron-bearing materials, e.g. a mixture of alumina and chromic oxide, as described in Pat. No. 3,446,669.

Still another form of inorganic separator material which can be employed according to the invention are porous sintered separators consisting essentially of a solid solution of a major portion of magnesium oxide and a minor proportion of an oxide such as zirconium dioxide, chromic oxide, aluminum oxide, titanium dioxide, and certain other oxides, as described in copending application Ser. No. 727,394, filed May 8, 1968 of Frank C. Arrance, et al., now U.S. Pat. 3,575,727.

Also, inorganic separator materials derived from natural chromite, termed ferrochromite, and containing oxides of iron, magnesium, aluminum and chromium and formed into a sintered solid solution, as described and claimed in copending application Ser. No. 727,678 of Frank C. Arrance, filed May 8, 1968, now U.S. Pat. No. 3,539,344, can be employed.

As further examples of inorganic separator materials which can be employed are sintered zirconia (zirconium dioxide) separators, e.g. calcia stabilized zirconia, and sintered alumina separators.

An exemplary form of alumina separator material is formed by compacting alumina (aluminum oxides), e.g. at pressures of about 5,000 to 10,000 p.s.i., into membranes, and sintering such membranes at temperatures ranging from about 300° C. to about 1,800° C.

As a further example, inorganic separator materials formed from chrome-iron and known as spinelloids and formed of $FeO-CrO_3$ and comprising 35% to 50% chromic oxide, together with some silica as magnesium silicates, can also be employed.

Additional inorganic materials which can be employed include silicates such as magnesium silicate (fosterite), and the like.

Preferred inorganic separator materials are those selected from the group consisting of (a) a solid solution of magnesium silicate and iron silicate, including olivine, (b) zirconia, (c) a solid solution of a major portion of magnesium oxide and a minor proportion of an oxide selected from the group consisting of zirconium dioxide, titanium dioxide, alumina and chromic oxide, (d) a solid solution of ferrochromite, (e) spinelloids and (f) alumina.

It will be understood that mixtures of the above materials also can be employed.

The term "inorganic separator materials" or "sintered ceramic separator material" as employed herein is intended to denote any of the above noted sintered inorganic separator materials.

Although not preferred, an organic separator can be employed in a battery according to the invention. Suitable inert organic materials or plastics having suitable porosity characteristics which can be employed include, for example, microporous plastics such as nylon, Dynel (vinyl-chloride-acrylonitrile copolymer), Teflon (polytetrafluoroethylene), cellophane, regenerated cellulose, sausage casing and the like. Although such organic separators can be employed, the strength, chemical inertness, temperature resistance and electrode support characteristics of the inorganic or ceramic separators are significantly superior. When employing organic separtors, such separators should be of a composition which will withstand the elevated temperatures employed during dehydration or removal of water from the battery according to the invention. Additional organic separators having high temperature resistance which have been recently developed are particularly suited for this purpose, such as grafted polymers and radiation cross-linked polymers.

The inorganic and organic separators as above described should be of suitable porosity such that the separator walls function to retain electrolyte, and permit transfer of electrolyte ions but prevent transfer of electrode ions. A porosity in the range of from about 5% to about 50%, and most desirably in the range of about 10% to about 30% is preferred. The above noted porous inorganic ceramic materials in particular have such porosity characteristics. The thickness of the separator, particularly where an inorganic separator is employed, can range, for example, from about .005" to about 0.050", although this range is only understood to be exemplary.

Also, flexible substantially inorganic separators can be employed. For example, flexible separators as described in U.S. application Ser. No. 676,223, filed Oct. 18, 1967, of Frank C. Arrance now Pat. No. 3,542,596, can be utilized in batteries according to the present invention, such flexible separators comprising a major portion of an inorganic or ceramic separator material of any of the types described above, such as olivine, a minor portion of potassium titanate in short fiber form, and a minor portion of a cured organic polymer, e.g. polyphenylene oxide, said cured organic polymer bonding the particles of said inorganic material and the potassium titanate fibers together, and forming a porous separator structure.

Additional examples of flexible substantially inorganic separators which can be employed are those described in U.S. application Ser. No. 676,224, filed Oct. 18, 1967, of C. Berger, et al. now abandoned, consisting essentially of a major portion of a porous inorganic material of any of the types described above, such as olivine, and a minor portion of a water coagulable organic fluorocarbon polymer such as vinylidene fluoride polymer, said polymer bonding the particles of the inorganic material together and forming a flexible membrane.

Also, flexible substantially inorganic separators as described in U.S. application Ser. No. 707,808, filed Feb. 23, 1968, of F. C. Arrance, et al., now abandoned can be employed, and which can be box-shaped to provide a compartment for a battery electrode, produced by applying on a flexible porous substrate, such as flexible sheets or mats of asbestos, a film comprising a mixture of an inorganic separator material such as olivine or zirconia, an organic polymeric bonding agent such as polyphenylene oxide or vinylidene fluoride polymer, bonding the particles of the inorganic material together with the binding agent and forming a porous substantially inorganic separator film on the flexible substrate.

As noted above, after assembly of the battery components, i.e. the electrodes and separator, an aqueous alkali electrolyte solution is then added. The alkali electrolyte in the form of an aqueous solution upon addition to the battery penetrates the electrodes, which are generally porous, and porous separator. Where the electrodes are relatively non-porous the electrolyte solution at least penetrates and is retained in the porous separator. For this purpose, any conventional alkali electrolyte solution can be employed. Preferred materials of this type are the alkalies potassium hydroxide, sodium hydroxide, and combinations thereof. The aqueous alkali electrolyte can have a concentration ranging from about 20% to about 50% but is preferably in the form of about a 30% to about a 40% aqueous solution. However, such concentration can vary outside the above ranges.

When the electrolyte solution has been added to the battery, the battery is fully charged, for example at 0.35 ampere to 2.10 volt cut-off, which brings the battery to the fully charged condition. In the case of the Ag-Zn electrode combination, for example, fully charging results in substantially all of the Zn electrode being in the form of Zn and the Ag electrode in the form of AgO.

The resulting, fully charged battery or cell is then subjected to drying at elevated temperatures to remove substantially all of the water from the aqueous alkali electrolyte solution.

Drying temperature is preferably in the range of from about 40° C. to about 100° C. Due to the lengthy period of time required for drying at atmospheric pressure, the drying is preferably carried out at reduced pressure, i.e. under vacuum conditions. Excellent results have been obtained in the above temperature range using a vacuum of from about 20 to about 30 inches mercury.

The temperature at which drying is conducted is preferably one which does not cause frothing or bubbling of the electrolyte. This phenomenon is more likely to occur at the start of the drying period and the probability of it occurring diminishes as the amount of water present in the battery or cell is reduced.

Drying or dehydration can be accomplished in one step by subjecting the battery or cell to vacuum drying at constant temperature, for example about 50° C. until the water is removed. By an alternate method, the cell or battery is subjected to vacuum drying first at a temperature in the range of from about 40° C. to about 60° C. until a majority of the water is removed from the electrolyte solution, and then vacuum drying at a higher temperature in the range of from about 60° C. to about 100° C. until substantially all of the remaining water is removed. The latter method is preferred since it permits drying in shorter periods of time than is possible by the one step method.

The period of time required for drying by either method will vary depending on the drying temperature, vacuum, battery size and amount of electrolyte solution initially present. The amount of water removed from the battery is preferably sufficient to provide an OCV (open circuit voltage) not in excess of about 0.005 volt, i.e. 0.005 volt or less. Under these conditions substantially all of the water has been removed from the aqueous electrolyte.

Removal of substantially all of the water from the electrolyte solution of the battery produces the "dry charged" state. The term "dry charged" as used in the specification and claims is meant to define a battery or cell which is substantially dry, i.e. substantially free of moisture, as defined above, which has its electrodes in the fully charged state, and contains the evaporation residue of an aqueous alkali electrolyte solution substantially uniformly distributed throughout the battery, or generally throughout its electrodes and separator components. After dry charging, the battery can be sealed for extended periods of time, e.g. for weeks or months and then activated substantially without any loss of capacity.

A battery or cell in the "dry charged" state is immediately activated by the addition of water, preferably distilled or deionized water, which can, for example, be introduced through the filling port, e.g. 32, shown in FIGS. 2 and 3. Although tap water can be employed, it is not preferred since it may reduce the performance efficiency and life of the battery. As soon as water is added to the battery to wet the battery, the concentration of electrolyte is immediately uniform throughout the battery, so that it is immediately in activation. If activation is not desired immediately, the "dry charged" battery or cell can be sealed against moisture and stored until power is required. At that time distilled or deionized water added to the battery brings about activation as described above.

A particularly advantageous feature of the "dry charged" battery is that it can be subjected to repeated charge and discharge cycles as well as repeated "dry charge" and activation cycles. Further, the "dry charged" battery of the invention can be used as a primary or secondary battery.

The following examples are presented for the purpose of illustrating the invention and are not intended to constitute a limitation thereof.

EXAMPLES 1–5

Five cells each comprised of four zinc and five silver electrodes and olivine (sintered solid solution of magnesium silicate and iron silicate) separators are assembled substantially as described in FIG. 2 above. The batteries are activated by the addition of a 30% aqueous potassium hydroxide solution and subjected to a period of several charge-discharge cycles. After a number of charge-discharge cycles, all of the cells are subjected to 5 months discharge stand at room temperature. Each of the cells with the exception of cells 3 and 5 is "dry charged" according to the method of the invention by removal of substantially all of the water from the electrolyte solution by drying in a vacuum oven. Cells 3 and 5 are dried in an oven at atmospheric pressure prior to vacuum drying as above described. The "dry charged" batteries are then subjected to from 1 to 12 weeks stand at room temperature, then activated to determine the percent of actual capacity of the cell after activation as compared to that prior to "dry charging," and then subjected to discharge-charge cycling.

The charge-discharge cycles, "dry charging," and activation as above described are summarized for each of the cells 1–5 in Table I below. The symbols used in Table I are defined below:

Ah=ampere hour  
A=ampere  
V=volt  
$V_f$=final voltage  
RT=room temperature  
OC=open circuit  
OCV=open circuit voltage

TABLE I

| Procedure | Cell 1 | Cell 2 | Cell 3 | Cell 4 | Cell 5 |
|---|---|---|---|---|---|
| Charged at 0.35 A to 2.10 $V_f$ | 8.25 Ah | 8.25 Ah | 8.25 Ah | 8.25 Ah | 8.25 Ah. |
| Discharged at 1.00 A to 1.00 $V_f$ | 7.60 Ah | 7.50 Ah | 7.25 Ah | 7.50 Ah | 7.60 Ah. |
| Charged at 0.35 A to 2.10 $V_f$ | 6.50 Ah | 6.50 Ah | 6.50 Ah | 6.50 Ah | 6.50 Ah. |
| Discharged at 5.0 A to 1.00 $V_f$ | 5.75 Ah | 5.75 Ah | 5.75 Ah | 5.50 Ah | 6.00 Ah. |
| Charged at 0.35 A to 210 $V_f$X | 6.39 Ah | 6.65 Ah | 6.30 Ah | 6.39 Ah | 6.65 Ah. |
| OCV after OC for 66 days | 1.84 V | 1.84 V | 1.84 V | 1.84 V | 1.84 V. |
| Discharged at 1.00 A to 1.00 $V_f$ | 6.30 Ah | 5.75 Ah | 6.30 Ah | 5.99 Ah | 6.50 Ah. |
| 5 months discharge stand at RT | Yes | Yes | Yes | Yes | Yes. |
| Charged at 0.35 A to 2.10 $V_f$ | 6.61 Ah | 7.35 Ah | 7.61 Ah | 7.35 Ah | 7.96 Ah. |
| Discharged at 1.00 A to 1.00 $V_f$ | 7.00 Ah | 6.80 Ah | 6.85 Ah | 6.70 Ah | 7.35 Ah. |
| Charged at 0.35 A to 2.10 $V_f$ | 7.35 Ah | 7.35 Ah | 7.35 Ah | 7.35 Ah | 7.35 Ah. |
| Cells 3 and 5 Dried in oven (atmospheric pressure): at 46° C. OCV | | | 1.85 V | | |
| OCV after 27 days at 46° C | | | 1.84 V | | 1.85 V. |
| Recharged at 0.35 A to 2.10 $V_f$ | | | 1.66 Ah | | 1.75 Ah. |
| Dried in vacuum oven at a temperature of | 48° C | 48° C | 52° C | 48° C | 52° C. |
| for a period of | 48 hrs | 48 hrs | 55 hrs | 48 hrs | 55 hrs. |
| and vacuum of | 28 in. Hg | 28 in. Hg | 28 in. Hg | 29 in. Hg | 29 in. Hg. |
| water lost | 18.27 gm | 17.6 gm | | | |
| OCV | 0.004 V | 0.004 V | 0.02 V | 0.002 V | 0.03 V. |
| OCV after 4 days stand at RT | | | 0.03 V | | |
| OCV after 1 week stand at RT | 0.296 V | 0.516 V | | | |
| OCV after 4 weeks stand at RT | | 1.68 V | | | |
| OCV after 8 weeks stand at RT | | | | | 0.54 V. |
| OCV after 12 weeks stand at RT | | | | 0.67 V | |
| Water added for activation: | | | | | |
| Under vacuum | 18.3 cc | 18.0 cc | 21.0 cc | 11 cc | |
| No vacuum | | | | | 17.0 cc. |
| OCV after 24 hr. stand at RT | 1.86 V | 1.86 V | | | 1.85 V. |
| OCV after 72 hr. stand at RT | | | 1.84 V | 1.84 V | |
| Discharged at 1.00 A to 1.00 $V_f$ | 6.50 Ah | 6.50 Ah | 6.25 Ah | 6.25 Ah | 6.00 Ah. |
| Charged at 0.35 A to 2.10 $V_f$ | 7.09 Ah | 6.74 Ah | | | |
| Discharged at 1.00 A to 1.00 $V_f$ | 6.71 Ah | 6.50 Ah | | | |
| Percent of actual capacity prior to "dry charging" | 93 | 96 | 91 | 82 | 93. |

As shown in the above Table I, all of the cells after "dry charging" and activation provide between 82% and 96% of the actual capacity prior to "dry charging."

EXAMPLE 6

A battery substantially as described in FIG. 2 is assembled using four zinc and five silver electrodes and olivine separators. A 30% aqueous solution of potassium hydroxide is added to activate the battery which is then fully charged at 0.35 A to 2.10 $V_f$. The battery is then placed in a vacuum oven with the filling port open, and dried, first at a temperature of 50° C. for ten hours leaving only wet NaOH. The oven temperature is then increased gradually over a period of two hours to 75° C. and held at that temperature until the open circuit voltage of the battery is less than 0.005 V.

The battery is activated by the addition of deionized water, and provides 92% of the actual capacity prior to "dry charging."

EXAMPLE 7

A battery substantially as described in FIG. 2 is assembled using four zinc and five silver electrodes and separators comprised of a solid solution of ferrochromite. A 30% aqueous solution of potassium hydroxide is added to activate the battery which is then fully charged at 0.35 A to 2.10 $V_f$. The battery is then placed in a vacuum oven with the filling port open and dried at a temperature of 55° C. for 8 hours followed by increasing the temperature to 88° C. over a period of three hours. Drying of the battery is continued at 88° C. until the open circuit voltage is less than 0.005 V. When activated with distilled water, the battery provides 90% of the actual capacity prior to "dry charging."

EXAMPLE 8

The procedure of Example 6 is repeated except employing in place of the olivine separators, flexible substantially inorganic separators consisting of about 90% of a sintered solid solution of magnesium silicate and iron silicate, about 5% potassium titanate fibers and about 5% cured polyphenylene oxide, by weight. Such flexible separators have a porosity of about 15%.

Results similar to those of Example 6 are obtained.

EXAMPLE 9

A battery substantially as described in FIG. 2 is assembled using four nickel and five cadmium electrodes and zirconia separators. A 40% aqueous solution of potassium hydroxide is added to the battery, and the battery is then fully charged to 1.60 $V_f$. The battery is then placed in a vacuum oven with the fill port open, and is dehydrated at about 50° C. for 48 hours to an open circuit voltage of about 0.005 V.

The battery is then activated by the addition of water.

EXAMPLE 10

The dry charging procedure of Example 9 is followed employing a battery having four silver and five cadmium electrodes and olivine separators.

Following dehydration as in Example 9, the battery is activated by the addition of water.

Thus, the "dry charged" battery of the invention is immediately activatable upon the addition of water and provides as much as 96% of actual capacity prior to "dry charging." Note from Table I above that after addition of aqueous alkali electrolyte to the cells, the cells can be charged and discharged to provide a quality control check with respect to capacity, prior to being given a final charge, followed by dehydration.

As further shown in Table I, Examples 1–5, "dry charging" can be done after the battery has undergone five months discharge stand. Further, when in the "dry charged" condition, the battery can be stored for long periods before activation.

Various modifications are contemplated and can be resorted to by those skilled in the art without departing from the spirit and scope of the invention as defined by the appended claims.

I claim:

1. A method for producing a water activatable battery comprising:
   adding an aqueous alkali electrolyte solution to a battery comprising as components a pair of electrodes of opposite polarity and a separator between said electrodes for retaining electrolyte and permitting transfer of electrolyte ions;
   charging the battery electrodes to the fully charged state; and
   drying the battery at elevated temperatures in the range of from about 40° to about 100° C., until substantially all the water from the electrolyte solution is removed from the battery.

2. The method of claim 1 wherein said drying at elevated temperatures is conducted at reduced pressure.

3. The method of claim 1 wherein the amount of water removal is characterized by providing an open circuit voltage not in excess of about 0.005 volt.

4. The method of claim 2, wherein the drying temperature is in the range of from about 50° C. to about 70° C. and employing a vacuum of from about 20" to about 30" mercury.

5. The method of claim 2, wherein the drying step is effected by drying in a vacuum at a temperature in the range of from about 40° C. to about 60° C. until a majority of the water is removed and then drying in a vacuum at a temperature in the range of from about 60° C. to about 100° C. until substantially all of the remaining water is removed.

6. The method of claim 1, wherein the separator is a porous inorganic separator.

7. The method of claim 1, wherein the aqueous alkali electrolyte solution is selected from the group consisting of potassium hydroxide, sodium hydroxide, and mixtures thereof.

8. The method of claim 7, wherein the electrolyte is in the form of about a 20% to about a 50% aqueous alkali solution.

References Cited

UNITED STATES PATENTS

| | | | |
|---|---|---|---|
| 3,366,511 | 1/1968 | Rousey | 136—170 |
| 3,446,668 | 5/1969 | Arrance et al. | 136—6 |
| 3,379,569 | 4/1968 | Berger et al. | 136—146 |
| 3,471,330 | 10/1969 | Berger et al. | 136—6 |
| 3,476,601 | 11/1969 | Berger et al. | 136—20 |
| 3,499,228 | 3/1970 | Port | 136—33 |

OTHER REFERENCES

Mellor, Comprehensive Treatise On Inorganic and Theoretical Chemistry, vol. 2, p. 497.

WINSTON A. DOUGLAS, Primary Examiner

C. F. LeFEVOUR, Assistant Examiner

U.S. Cl. X.R.

136—83, 175